W. L. Harley,
Mortising Machine.
Nº 1,723.          Patented Aug. 14, 1840.
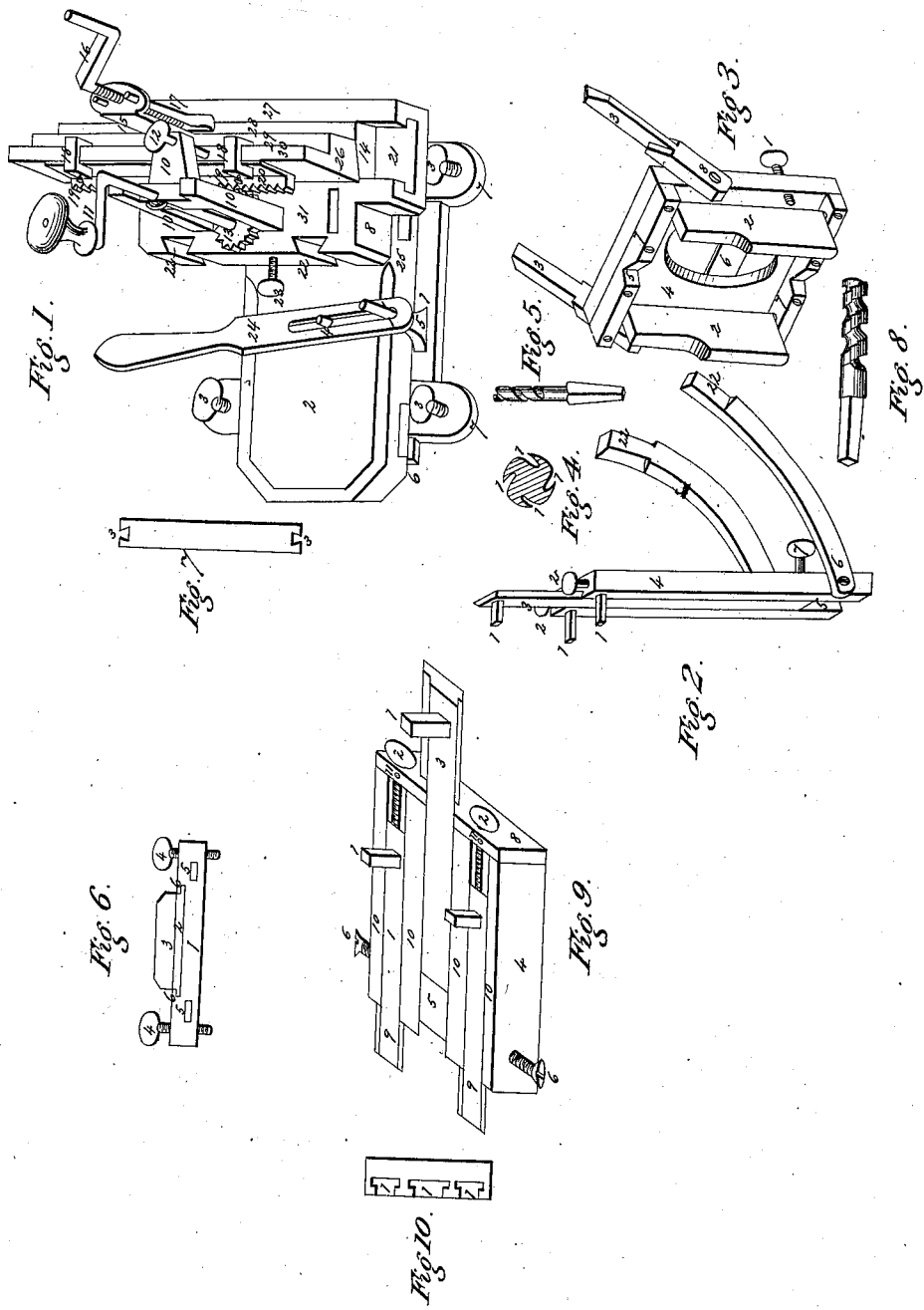

UNITED STATES PATENT OFFICE.

WM. L. HARLEY, OF CHAGRIN FALLS, OHIO.

MACHINE FOR BORING AND MORTISING IN CHAIR SEATS, LEGS, AND ARMS.

Specification of Letters Patent No. 1,723, dated August 14, 1840.

*To all whom it may concern:*

Be it known that I, WILLIAM L. HARLEY, of Chagrin Falls, in the county of Cuyahoga and State of Ohio, have invented a new and improved mode of boring holes and mortises in chair seats, legs, arms, or posts and small work generally with a bit constructed specially for that purpose and carriages made to move so as to give length to the mortises and depth both to the mortises and holes to be bored, and frames on which to place the seats, legs, &c., which are to be bored not requiring a right-angular position; and I do hereby certify that the following is a full, clear, and exact description of the construction and operation of the same, reference being had to the drawings accompanying this specification and forming a part of the same, in which—

Figure 1, represents a side view of the detached part of the machine which is used in mortising; Fig. 2 and Fig. 9 represent the frame on which the seats are placed for boring; Fig. 3 is the frame on which the legs are placed for boring; Fig. 4 exhibits an end view of the bit; Fig. 5, a side view of a small bit, and Fig. 8 a side view of a large bit; Fig. 6, represents the back end of the frame which constitutes the lower part of the machine, together with the elevating screws and the back end of the bottom piece of the lower carriage which rests upon the frame and moves in it; and Fig. 7 represents the forward end of the same bottom piece.

To construct the machine, first make the lower frame or bed in which the lower carriage moves, as follows: Take two pieces of hard wood timber, 16 inches long, three inches wide by 2 inches thick; and about 2 inches from each end of these pieces, through the width of them, make a mortise, 2 inches by $\frac{1}{2}$ inch (5, 5) Fig. 6. One of these pieces, as it presents itself at the back part of the machine, is seen at (1) Fig. 6, and one end of each is seen at (7, 7) Fig. 1. Next take two other pieces of the same timber, 15 inches long, 2 inches wide, by $1\frac{1}{4}$ inches thick, on each end of which, make a tenon to fit the mortises made in the other two pieces, the width of the tenons corresponding with the width of the pieces on which they are made. One of these pieces is seen at (1) Fig. 1. Then put these 4 pieces together so as to make a 4 sided frame nearly square, the ends of the 2 first and largest pieces projecting about 2 inches, the under sides corresponding throughout, but the greater thickness of the 2 mortised pieces making them the highest. Through the middle of the projecting ends, bore holes perpendicularly, 1 inch in diameter, through which put elevating screws 4 inches in length exclusive of the head, so that the frame will rest at the corners upon these screws, and so that by means of them the frame and whole machine may be elevated or lowered at pleasure. The object of thus elevating and depressing the machine is hereinafter described. Two of these screws are seen at (4, 4,) Fig. 6, and three of them at (3, 3, 3) Fig. 1. In the upper side and across the middle of the 2 pieces mortised, a gain is cut $9\frac{1}{2}$ inches long, and about $\frac{3}{4}$ of an inch deep, running under about $\frac{1}{2}$ an inch at each end so as to form a kind of groove. The shape and place of this gain and groove, are seen at (2) Fig. 6. The object of this gain and groove is for the lower carriage to move in.

The lower carriage consists of a bottom piece, (Fig. 1,) 2 which is fitted to and moves in the gain or cut as just described, with a lever (24) Fig. 1 so attached to the bottom piece as to move it backward and forward longitudinally at pleasure, and to this bottom piece the whole machinery above is so attached as to be moved with it, thus giving depth to the holes or mortises. For the bottom piece take a plank 16 in. long, 9 in. wide and 2 in. thick. Across the under side of this fasten 2 cleats, one near each end, just as far apart as the mortised pieces of the lower frame, 3 inches wide, 1 in. thick, and long enough to extend about $\frac{3}{4}$ of an in. each side of the bottom pieces, this being the whole length of the gain above described, including grooves. The cleats are sunk into the bottom piece about $\frac{1}{4}$ of an in. and on the lower sides of the ends, tenons are made $\frac{1}{2}$ in. thick, and of the width of the cleats, leaving the shoulder all on the upper side. These tenons fit the grooves at the ends of the gains made in the lower frame. The back end of the bottom piece is seen at (3) Fig. 6. The back cleat fitting the gain at (2) Fig. 6, and the tenons at the ends of the cleats fitting the grooves (6, 6) Fig. 6. The forward cleat is constructed in the same manner. The lever, (24) Fig. 1, is made 2 feet long 1 inch thick and 2 inches wide except at the end at which the hand is to be applied. The lever is fastened at the end to a stud, or post, 4 inches long, which is inserted perpendicularly by means of a tenon, into one of the tenoned pieces of the lower frame and about three inches from the back mortised piece. This post, or stud is shown at (5) Fig. 1, and terminates at the top with a pin, one inch in diameter, on which, as a fulcrum, the end of the lever turns. The lever is also fastened to the middle of the bottom piece, about 6 inches from the back end, by means of a wooden pin ¾ of an inch in diameter, which pin is made fast to the upper side of the bottom piece, and works freely in a ¾ inch mortise 3 inches long in the lever. See this pin in the mortise of the lever at (4) Fig. 1. The lever can be fastened on either side of the frame to suit a left or right handed person. Fig. 7 shows the forward end of the bottom piece. On each side, or edge of this immediately at the end is a dovetailed mortise (3, 3,) to receive the arms (3, 3) Fig. 3, which are to support the frame on which the legs are placed for boring. This frame and the arms, are described hereafter. These mortises are about one inch on the outside 1¼ in. inside, ¾ in. deep, and two inches long. One of these is also seen at (25) Fig. 1.

To support the upper carriage, two posts are mortised into the top of the bottom piece above described, ½ inch from the forward end and one inch from the sides. The mortises are four inches long being made lengthwise of the bottom piece in which they are made and one inch wide. The posts which enter these mortises by means of tenons made to fit them, are 1½ inches long, or high from shoulder to shoulder, 5 inches wide, by 1½ in. thick with tenons upon the upper ends, 1½ in. square, which enter two mortises of the same size, made in the bed piece of the upper carriage. These posts are to support the upper carriage. The place of one of the mortises made in the bed piece of the upper carriage for one of these posts is seen at (9) Fig. 1. The upper carriage consists of a bed piece, a back piece a forward piece nailed on the top of the bed piece, a bottom piece and a top piece &c. The bed piece consists of a plank 1½ in. thick, 8 in. wide 16 in. long, and is mortised on the top of the two posts as last described; lying transversely across the lower carriage the forward edge lying directly over and parallel with the forward end of the lower carriage. On the upper side of the back part of this bed piece is nailed or screwed another piece, called the back piece, being of the same length with the bed piece ⅛ inch thinner, 3½ in. wide having the forward edge rabbeted at the lower corner, the rabbet being ½ inch square. On the upper side of the forward part is nailed or screwed the forward piece 1½ in. square of the same length as the bed piece, rabbeted like the last, the rabbet facing the other rabbet. The back piece may be seen at (31) and the forward piece at (27) Fig. 1. (At 8 is represented a notch cut from the corner of the back piece, on the back side. This may be done or not, as it is only for ornament.) Thus is formed the bed of the upper carriage, one end of which is seen at (21) Fig. 1. For the bottom piece of the upper carriage take a plank 16 in. long 4¼ in. wide 1¼ in. thick rabbeted on the upper side so as to fit the bed and grooves made by rabbeting the back and forward pieces and so made as to slide with ease. One end of this bottom piece is shown at (14) Fig. 1 slid back a little in the bed, and the upper side of the fore part of it at (28) Fig. 1, and it is on this fore part of the bottom piece viz. (28) Fig. 1 that the timber is placed to be mortised. The top piece of the upper carriage consists of a piece of plank 3 in. wide 1½ in. thick, and fifteen in. long screwed from below on the upper side of the bottom piece setting up edgewise, so that the back side will correspond with the back shoulder of the bottom piece. A ¾ inch rabbet is now made in the forward and upper corner of this top piece and the whole length of it. The end of this top piece is seen at (26) Fig. 1, and the rabbet at (29) Fig. 1. This rabbet being taken out, leaves a part at the top, on which are screwed grips, or clasps for gaging the length of the mortises. This part of the top piece may be seen at (30) Fig. 1. On the back of the top piece and in the middle, is fastened by means of screws, a plate of iron (20, 20) Fig.1, 2½ inches wide, running about to the top, but not reaching quite to the bottom, ¼ in. thick, except the projection at the bottom constituting the rack, this rack is ½ inch thick including teeth which are ¼ inch deep facing backward, and filling up the entire length of the rack which is of the same length as the iron plate with which it is connected, viz: 12 inches. One design of this iron plate is to prevent the grips from wearing the wood. The grips are seen screwed on this top piece, at (18, 18) Fig. 1. They are made of iron ¾ of an inch wide, ¼ in. thick, bent in the shape of a half square, being an inch in the clear, with a screw in one end to fasten them tight at any place on the top piece. The screws are represented at (19, 19) Fig. 1. Of these grips two or more can be used.

The teeth of the rack just described, match into a cog wheel of cast iron 2 inches in diameter (including cogs) and ⅝ of an inch thick. This wheel has 16 cogs and is shown at (13) Fig. 1. It is attached to a perpendicular iron shaft ¾ in. in diameter 1 foot long the lower end passing through the middle of the wheel and setting into the piece screwed on the back part of the upper bed piece. Three inches above this back piece the shaft is supported by passing through the middle near the back edge of a girt framed into two posts, one on each side of the shaft, being 6 inches apart, 6 inches high, and made as also is the girt of 1½ inch square stuff. The girt has a staple designed to support the shaft driven into the back, so that the shanks may embrace the shaft. This staple is seen at (32) Fig. 1. It has also an arm framed into it at the center projecting forward 2 in. being 1¼ in. square. The posts, together with the arms are numbered (10, 10, 10) in Fig. 1. Through the middle of the arm ½ in. from the forward end, is bored perpendicularly a hole ¼ inch loose enough to be taken out and dropped in iron governing pin, headed at the top, and loose enough to be taken out and dropped in at pleasure, and long enough to reach the top piece on which the grips are screwed. This pin, passing down between the two grips may be seen at (12) Fig. 1. The design of this pin is to stop the upper carriage in its motion each way. When the grips are brought up to it, thus governing the length of the mortise to be bored. The top of the shaft is bent to form a crank (11) with a sweep of 5 inches or a crank may be fastened on the top by a screw and nut. On the end of the crank is an upright handle either made fast or made to turn on the pin that passes through its center. In the forward side of the top piece and directly in the center is cut from top to bottom a gain 1 inch wide and ½ in. deep in which is set upright a wrought iron standard 8 in. high and ½ inch thick, and one inch wide fastened in the gain by screws, and terminating at the top with a piece of the same metal which projects forward two inches at right angles with the standard, and made sufficiently wide to admit of 3 holes 1 in the center ½ inch in size cut with threads to receive a ½ inch perpendicular screw, and one each side ¼ inch from the middle hole and ⅜ in. in size. This standard with the three holes in the top part may be seen at (15,) Fig. 1. A steel spring is then made 1¼ in. wide, in shape somewhat resembling a jewsharp bow, the shanks being rounded ⅜ inch in size, 4 in. long and passing up through the two side holes in the top of the standard. The spring is represented at (17) Fig. 1. The bow of the spring is so bent that the bend is 4 in. wide 1½ in. high the center rising about ¼ of an inch and left a little thicker than the other part. Through this center passes the lower end of the perpendicular screw which rises through the middle hole in the top of the standard. The hole through which the lower end of the screw passes is ⅜ of an in. large, and the screw is confined to the spring by being headed on the under side so that by raising or lowering the screw the spring will be carried up and down with it the shanks slipping freely through their holes. The screw thus confined to the spring and rising through the middle hole is 6½ in. high with a crank at the top having 2½ in. sweep, resembling the crank at the top of the shaft above described, but in the most elevated position of the screw moving under the other crank. This crank at the top of the screw is shown at (16) Fig. 1. The object of the spring is to confine the piece of timber to be mortised upon the forward part of the upper carriage at (28) Fig. 1, and the shanks of the spring by passing through the holes made for them, keep the spring from turning when it is screwed down upon a round piece of timber. That part of the machine which I have now described is called the mortising machine. Before describing its application and use I will describe the construction of the bit that is used with it.

The bit is made as follows: Take a piece of steel suitable for the purpose, and fit the shank to the mandrel of the lathe; and hammer the other end flat; then twist it in the form of a common screw auger. The end is a little circling and made with two cutters or lips like the end of an auger, but without any screw at the point. Teeth or cutters are then made on the sides that is, on the spiral edge which is formed by twisting the bit as above described. These cutters are made with their edges in the direction which the bit is designed to turn, being filed in with a 3 cornered file, by filing lengthwise from the end. A small bit may be made in the same way, or it may be made without twisting by filing the hollows in a spiral form into solid stuff, so that the bit will clear itself of chips, and then filing cutters upon the side as in the case of a twisted bit.

The number of cuts will of course depend on the size of the bit. An end view of the bit is shown at Fig. 4, and a side view of a small bit at Fig. 5, and a side view of a larger or twisted bit at Fig. 8. The side cutters are seen at the end view (1, 1, 1, 1,) Fig. 4.

The application and operation of this mortising machine is thus described. Attach the machine to a common lathe or to a lathe constructed specially for the purpose; to do which make holes in the bench of the lathe, for the elevating screws of the lower frame to rest in; or a plank may be used with holes at each corner for the elevating screws, and this plank fastened to the bed of the lathe. The bit being now placed in the mandrel, and the machine on the lathe as just shown, let the timber to be mortised be laid on the forward part of the upper carriage at (28) Fig. 1, under the spring, the side to be mortised facing the bit. The spring being now screwed down upon the timber confines it in its place. By the elevating screws, the machine is elevated or lowered to present the place of the mortise before the bit, and then by means of the lever connected with the lower carriage, the timber is pressed against the bit until a hole is made at one end of the mortise, of the depth of the required mortise. Then by turning the crank by which the upper carriage is moved, the timber is pressed against the side of the bit, and thus the length of the mortise is obtained, care being previously taken to gage this length by the position of the grips or clasps, screwed on the top piece of the upper carriage, and the carriage being stopped each way by the governing pin when the grip is brought up to it. This part of the machine may not only be used in the boring of mortises in chair arms, but it may be advantageously applied to the mortising of sash, cabinet work, and most small work.

When chair legs are to be bored, as they are to be bored obliquely, the frame, represented at Fig. 3 is connected with the machine. To make this frame, take a board, 8 in. square, 1 in. thick, with a round hole cut in the center, about 4 inches in diameter. Across each end of the board, on the upper side nail or screw a cleat 1 inch thick, and 1½ inches wide, setting up edgewise, which serves the double purpose of preventing the board from splitting, and by having a notch cut in the center of keeping the chair leg in its place to be bored. This board is seen at (4) Fig. 3, the cleats at (7,7) and the notches cut in the top of the cleats in the shape of a ½ diamond, 1 inch deep at (5, 5). Two wings are then made, both fastened on the upper face of the board just described, one about 2 inches from each side. The wings are 6 inches long 2½ inches wide, ¾ inch thick with a round tenon ½ inch in size left at each end, running out from one edge about ½ inch, and entering holes made for the purpose in the cleats, 2 inches from their ends, so that the wings may turn upon these tenons, over together toward the middle of the frame, or apart, outward toward the edge. Outside of these wings, and about ½ inch from the edge of the board a ½ inch hole is made through the board, and a thumb screw, 3 inches long passed through the hole from the under side, running up against the wing, by means of which the wing is raised, or turned upward to any pitch required. The design of the wings is, after one hole is bored in a leg, and one round is in, to give the proper angle to the other hole, by letting the round rest over on the wing; the leg being in the notches. The wings are represented at (2, 2,) and one of the thumb screws at (1,) Fig. 3. Two arms (3, 3) Fig. 3, made of inch stuff 1½ inches wide, and 5 inches long are screwed, one on each edge of the board, which has the thumb-screw, two inches from the lower end, so that the arms will turn on the screws, one screw passing through one end of each arm. One screw is seen at (8) Fig. 3. The other end is made to fit the dove-tailed mortises made in the forward end of the bottom piece of the lower carriage, as seen at Fig. 7. To use this frame, let the ends of the arms be placed in the mortises, and the upper end of the frame running up and resting over on the forward piece of the upper carriage. Through the middle of the bed piece of the upper carriage, from the back side passes an iron rod, 15 inches long ½ inch in size, with a screw cut on it, coming out in front, directly under the center of this last mentioned frame. This rod is represented at (23) Fig. 1. By screwing this rod out forward, the end of it presses against a strip nailed across the hole of the frame on the under side, which strip is represented at (6) Fig. 3, thus raising the frame and giving it any degree of inclination according to the obliquity of the hole to be bored. Now in order to bore the hole in the leg let the frame be adjusted so as to present a proper degree of obliquity to the bit, place the leg in the notches, hold it firmly with one hand, and with the other hold of the lever, bring it up to the bit, and bore to any depth required.

For boring seats, another frame is used, for the seats to rest on. This is seen at Fig. 2 and Fig. 9, and is made as follows. Take an inch board, 9 inches wide and 18 inches long, and on the upper side, and lengthwise of it, nail four strips (10, 10, 10, 10) Fig. 9, of the same length and thickness and about an inch wide, the 2 outside ones on the edge, and the other two 1 inch from these, rabbeting the two outside ones on the inner and lower corners, and the other two on each lower corner, half the thickness of the strips, the rabbets forming grooves ⅜ of an inch high by ¼ of an inch wide, or deep. Between these strips, will thus be formed beds for 3 slides, with grooves on each side, the middle one about 2¼ inch wide and the 2 outside ones about 1 inch wide each exclusive of the grooves. These three slides, of the length and thickness of the strips are then made to fit these beds, and rabbeted so as to match with the grooves. On each edge of this frame, 2 inches from the end which is to be the top when the frame is attached to the machine, is screwed an arm 14 in. long, 2 in. wide, turning freely at the ends, where they are screwed to the frames, and made sufficiently curving, for the other ends to enter the dove-tailed mortises in the back piece of the upper carriage. These mortises are made in the back edge of the back-piece of the upper carriage, and extend down through the bed piece. The ends of the arms are fitted to these mortises. The middle slide, shoved a little down is shown at (3,) Fig. 2; and Fig. 9 the bed in which it moves at (5,) the edge of the frame at (4) the screw fastening the end of the arm at (6); the tenons at the ends of the arms at (22, 22,) Fig. 2, and Fig. 1 (22, 22,) shows the mortises in the back of the upper carriage, to which the tenons on the end of the arms are fitted. In the upper side of each of the slides, 2 inches from the lower end is a pin ¾ of an in. square, and 1½ in. long. The pins may be seen at (1, 1, 1) Figs. 2 and 9. The middle slide is made so as to move upward or downward. The others slide upward only. From the under side, through the lower board of the frame, and about 6 inches from the upper end passes a thumb screw, which, crowding against the middle slide, holds it in its place at any point to which it may be moved. This screw is represented at (7) Fig. 2. On the lower end of the frame, is nailed a piece or collar, ½ in. thick, covering the end of the frame, with a groove cut in it for the middle slide, which groove is fitted to the slide so that the slide can move downward in it. Through this collar, and into the ends of the outside slides, are bored holes, one in each, 2½ in. deep or more, and ⅜ or ½ in. in size; the holes in the slides being made with threads to admit screws. The screws are of wood or iron. They are prevented from sliding in the collar, by having a small groove or notch cut around them and a pin (11, 11) Fig. 9 passing through the collar down into this groove or notch. Being so constructed, the screws can turn in the collar, but cannot slide out and in. By turning these screws the slides in which they are placed, will be pushed upward or drawn downward, for purposes hereinafter described. These screws are shown in the ends of the slides at (2, 2,) Fig. 2, and 9 and the collar at (8) Fig. 9, and the 2 outside slides at (9, 9), Fig. 9. The ends of the slides seen at 1, 1, 1, Fig. 10.

When seats are to be bored, the frame Fig. 3 is removed, and the frame last described is attached to the machine as follows. Let the arms (22, 22,) extend over the back part of the upper carriage and enter the mortises (22, 22) Fig. 1, the frame lying over the front side of the machine, the upper end supported by the arms, and the lower part resting upon the iron rod which passes through the middle of the bed piece of the upper carriage, from the back side. By means of this rod, any degree of inclinatioin may be given to this frame. In boring the holes for the legs in the back part of the seat, as they have to be bored, more obliquely than the others, the rod should press the bottom of the frame out giving it more inclination. The seat when bored, rests upon the frame with its edge on the pins in the slides, and its corner upon the center pin, the middle slide being settled a little lower than the others. By elevating or lowering the middle slide the hole will be made at a greater or less distance from the edge of the seat. Then the different slants are given to the holes by canting or turning the seat to the right and left and by adjusting the slides. In boring the holes in the seats for the arms and rounds, the slides are so adjusted that the position of the pins will correspond with the circle of the seat, and the edge of the seat rests on the three pins.

What I claim as my invention and desire to secure by Letters Patent is,

1. The construction of the bit with cutters on the end and teeth in the side, in combination with the twist, for the purpose and in the manner described.

2. The combination of the two carriages, the lower one resting upon a stationary frame and moved in it lengthwise by a lever to give depth to the holes and mortises to be bored, and the upper one moved transversely by a crank to give length to the mortises, as described.

3. The construction of the frame for the seats to rest on, so as to be presented obliquely to the bit, in combination with the lower carriage as described.

4. The construction of the frame for the legs to rest on to be presented obliquely to the bit, in combination with the lower carriage as described.

WM. L. HARLEY.

Witnesses:
L. D. WILLIAMS,
C. T. BLAKESLEE.